UNITED STATES PATENT OFFICE.

JOHN L. KELLOGG, OF BATTLE CREEK, MICHIGAN.

BEVERAGE EXTRACT.

1,177,037.  Specification of Letters Patent.  Patented Mar. 28, 1916.

No Drawing.  Application filed November 27, 1914.  Serial No. 874,155.

*To all whom it may concern:*

Be it known that I, JOHN LEONARD KELLOGG, a citizen of the United States, residing at Battle Creek, county of Calhoun, and State of Michigan, have invented a new and useful Improvement in the Manufacture of Beverage Extracts, (Case C,) of which the following is a specification.

My invention relates in general to the manufacture of beverage extracts, in powdered or granular form, quickly soluble in water, from starch bearing materials, such as wheat, corn, rye, barley and other cereals, beans, peas, nuts, taro and arrow root.
These extracts are intended to be dissolved usually in hot water for use as a healthful beverage, in place of coffee and other beverages considered less healthful.

I am aware that United States patents to Gale No. 48,268, dated June 20, 1865, and to Barotte No. 439,318, dated October 28, 1890, describe a soluble coffee powder produced by evaporation in the ordinary way from an ordinary decoction, extract or solution of coffee.

I am also aware that British patent to Reichert No. 9133 of 1903, describes a soluble beverage powder produced in the same way from chicory, the solid soluble extract thus obtained consisting of extractive matter in solid water soluble form of roasted starchy matter and caramelized saccharine matter.

I am also aware that British Patent No. 6262 of 1895 describes a solid soluble beverage powder produced in the same way from barley malt flour and bran, the solid soluble extract thus obtained consisting of extractive matter in comminuted condition of a roasted cereal or cereal products.

I am also aware that since 1895 a liquid beverage extract made by percolation from a mixture of roasted wheat and bran and caramelized molasses has been in general public use throughout the world, the greatest amount of said mixture of roasted wheat, bran and caramelized molasses having been sold under the adopted name of "Postum Cereal." In 1909 and subsequently, I made a soluble beverage powder of this mixture of roasted wheat and bran and caramelized molasses by evaporating to dryness in the usual way the solution obtained by percolation from this mixture.

In a different and later invention made by me, I dispensed entirely with the molasses, sugar, syrup, or other saccharine body, which was an essential element of the said earlier product, and relied instead on the addition of malt to the starch bearing material, the whole being so treated by heat and otherwise that the starch was converted by the diastatic action of the malt into maltose and caramelization of the maltose ensued. The soluble contents of the product were then dissolved out of the same, the resulting solution evaporated and the evaporated solution reduced to a dry comminuted condition, thereby forming a solid extract which was quickly soluble in water and when properly prepared made a healthful beverage having the flavor and general characteristics of coffee. The said later process is described and broadly claimed in a United States Letters Patent issued to me December 15, 1914, and the product therein described is broadly claimed by me in my application for United States Patent Serial Number 866645, filed October 14, 1914.

In the specific performance of the said invention described in my said Letters Patent of December 15, 1914, the evaporated solution referred to is reduced to the desired dry comminuted condition by evaporating the solution to complete dryness in the form of a solid mass, which is then ground into the granular powder therein selected as the final form of the solid soluble extract. In the specific performance of the said broad invention as improved and described in my said later application for patent, filed October 14, 1914, the evaporated solution is also evaporated to complete dryness to form a solid mass, which is then ground into powder of the desired coarseness or fineness.

The subject of the present application is an improvement in the method of reducing the evaporated solution to the final dry comminuted condition in the broad process, of which three specific instances are above given.

This improvement, in its specific performance, comprises, briefly, ejecting the evaporated solution in the form of a spray, subjecting the spray to heat, and collecting the fine dry powder thus formed, which makes a solid soluble extract which is very fine and dissolves instantly in hot water.

I now prefer to perform this improved process in detail as follows: I use as the starch bearing material, by preference, a mixture consisting of ten parts bran, five parts wheat flour, five parts corn flour, and ten parts rye flour, to which I prefer to add ten parts malt flour and five parts finely ground malt sprouts. In place of the above starch bearing materials, however, beans, peas or any starch bearing tubers may be used, likewise nuts, taro, arrow root and similar substances.

I make a heavy dough of the above ingredients preferably by placing them in an ordinary baker's mixer and mixing with water until the dough is formed. This dough is then, by preference, molded into loaves which are placed for efficiency and convenience in a warming oven and maintained at such a high temperature for such a time that the diastatic action of the malt will convert part or all of the starch into maltose.

I at present achieve the best results by keeping the loaves at a temperature of about 140° to 160° F. for about two hours. The loaves are then, by preference, dried, cut into slices, and ground into granular form, the grains being about the size of beans or peas or smaller. This granular compound is then roasted preferably by placing in an ordinary coffee roaster and roasted to a light golden brown, the maltose at the same time becoming caramelized. The soluble contents of the resulting compound are then extracted from the grains, preferably as follows: The roasted grains are placed in a cooker and cooked until all the soluble matter has been extracted. The mass is then placed in a percolator or cooker and hot water poured over the same and drained off repeatedly until all the soluble extract is obtained.

The specific performance of the process so far described is substantially the same as that described in my said prior application for United States Letters Patent Serial Number 866645, filed October 14, 1914.

To reduce the soluble extract or solution thus obtained to the desired dry comminuted condition, I now evaporate and boil down the solution preferably in an ordinary vacuum pan until it will test approximately 50° B. on the hydrometer. This evaporated solution is then by preference pumped at high velocity, through a finely perforated spray nozzle. I find I accomplish the desired results by a spray velocity estimated at from five thousand to twenty thousand feet a minute, the powder being finer as the velocity increases; but the velocity may be either higher or lower than those figures. The fine spray thereby formed is heated, preferably, by driving it directly in front of a hot air blast, whose temperature in practice varies from 150° to 250° F., according to the color of the final product desired; the higher the temperature, the darker the color. The sprayed product thus heated and dried is, preferably, thrown against a baffle plate and collected for packing and distribution.

By this improvement in my process, the flavor and solubility of the product is greatly improved, and the process of manufacture very much facilitated and perfected.

I have thus described in detail one exact method of performing my improved process, but to determine the spirit and scope of my invention reference is to be had to the following claim.

I claim as my invention:

A solid soluble extract for preparing beverages in the form of a fine powder and prepared by desiccating a spray of the soluble matter of a roasted starch bearing material.

JOHN L. KELLOGG.

In presence of—
FLORENCE CLARK,
C. H. HUGHES.